(12) United States Patent
Naganuma

(10) Patent No.: US 8,252,469 B2
(45) Date of Patent: Aug. 28, 2012

(54) FUEL CELL SYSTEM AND WATER DISCHARGE CONTROL METHOD FOR THE SYSTEM

(75) Inventor: Yoshiaki Naganuma, Nisshin (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 1044 days.

(21) Appl. No.: 12/279,863

(22) PCT Filed: Oct. 16, 2007

(86) PCT No.: PCT/JP2007/070506
§ 371 (c)(1),
(2), (4) Date: Aug. 19, 2008

(87) PCT Pub. No.: WO2008/050699
PCT Pub. Date: May 2, 2008

(65) Prior Publication Data
US 2010/0227238 A1    Sep. 9, 2010

(30) Foreign Application Priority Data
Oct. 19, 2006  (JP) .................................. 2006-284580

(51) Int. Cl.
*H01M 8/04* (2006.01)
(52) U.S. Cl. .................... 429/429; 429/442; 429/450
(58) Field of Classification Search .............. 429/429, 429/433, 442, 450
See application file for complete search history.

(56) References Cited

U.S. PATENT DOCUMENTS

| 7,645,533 | B2 | 1/2010 | Fukuda | |
|---|---|---|---|---|
| 7,771,854 | B2* | 8/2010 | Kotani et al. | 429/429 |
| 2003/0118883 | A1* | 6/2003 | Breault et al. | 429/26 |
| 2006/0035120 | A1* | 2/2006 | Sakai | 429/22 |

FOREIGN PATENT DOCUMENTS

| CN | 1666371 A | 9/2005 |
|---|---|---|
| JP | 2003-297404 A | 10/2003 |
| JP | 2004-39526 A | 2/2004 |
| JP | 2004-178901 A | 6/2004 |
| JP | 2004-207093 A | 7/2004 |
| JP | 2006-134771 A | 5/2006 |
| JP | 2007-184199 A | 7/2007 |
| JP | 2007-250311 A | 9/2007 |

\* cited by examiner

*Primary Examiner* — Matthew Landau
*Assistant Examiner* — Colleen E Snow
(74) *Attorney, Agent, or Firm* — Kenyon & Kenyon LLP

(57) ABSTRACT

There is disclosed a fuel cell system including a fuel cell, a water discharge channel through which a water content discharged from this fuel cell flows, and a water discharge valve which discharges, from the system, the water content in this water discharge channel, and the fuel cell system further includes a water discharge control section for controlling the water discharge valve so as to inhibit the water discharge from the water discharge valve from a time when the starting of the system is requested to a time when the temperature of the system reaches a predetermined temperature, in a case where the starting of the system is requested in an environment where an outside air temperature is less than a predetermined threshold value.

7 Claims, 4 Drawing Sheets

FUEL CELL SYSTEM AND WATER DISCHARGE CONTROL METHOD FOR THE SYSTEM

This is a 371 national phase application of PCT/JP2007/070506 filed 16 Oct. 2007, which claims priority of Japanese Patent Application No. 2006-284580 filed 19 Oct. 2006, the contents of which are incorporated herein by reference.

TECHNICAL FIELD

The present invention relates to a fuel cell system and a water discharge control method for the system.

BACKGROUND ART

Heretofore, a fuel cell system including a fuel cell which receives the supply of a reactive gas (a fuel gas and an oxidizing gas) to generate a power has been suggested and put to practical use. In the fuel cell of such a fuel cell system, and a fuel off gas circulation channel, an impurity gas such as nitrogen or carbon monoxide generated during power generation, and a water content are accumulated with an elapse of time. To discharge such a gas and water content from the system, a technology (a purge technology) is suggested in which the circulation channel (or a discharge channel connected to this circulation channel) is provided with a gas discharge valve and a water discharge valve, and these gas and water discharge valves are controlled to open and close, whereby the accumulated gas and water content are discharged after each predetermined time.

Moreover, at present, a technology is suggested in which a purge valve for performing the gas discharge/water discharge is controlled to open and close in a low-temperature environment, whereby the low-temperature start performance of the fuel cell system is improved. For example, a technology is suggested in which in the low-temperature environment, an ignition switch is turned on, and then the purge valve is once opened to perform purge processing. Afterward, in a temperature raising process, the purge processing is prohibited until the fuel cell is warmed up, whereby the temperature drop of the fuel cell due to the supply of a new hydrogen gas is suppressed (see Japanese Patent Application Laid-Open No. 2004-178901).

DISCLOSURE OF THE INVENTION

However, in a case where the technology disclosed in Japanese Patent Application Laid-Open No. 2004-178901 is employed, an ignition switch is turned on, and then purging is once performed, so that a water content flows into a purge valve having a temperature thereof lowered in a low-temperature environment, and the water content which has flowed into this valve might be frozen. In a case where the water content which has flowed into the purge valve is frozen in this manner, it is supposed that the purge valve closes and that it becomes difficult to perform the subsequent purge processing.

The present invention has been developed in view of such a situation, and an object thereof is to prohibit a water discharge valve from being frozen in a low-temperature environment in a fuel cell system provided with the water discharge valve.

To achieve the object, a fuel cell system according to the present invention comprises: a fuel cell; a water discharge channel through which a water content discharged from this fuel cell flows; and a water discharge valve which discharges, from the system, the water content in this water discharge channel, the fuel cell system further comprising: water discharge control means for controlling the water discharge valve so as to inhibit the water discharge from the water discharge valve from a time when the starting of the system is requested to a time when the temperature of the system reaches a predetermined temperature, in a case where the starting of the system is requested in an environment where an outside air temperature is less than a predetermined threshold value.

Moreover, a water discharge control method according to the present invention is a water discharge control method of a fuel cell system including a fuel cell, a water discharge channel through which a water content discharged from this fuel cell flows, and a water discharge valve which discharges, from the system, the water content in this water discharge channel, the water discharge control method comprising: a first step of judging whether or not the starting of the system has been requested; a second step of judging whether or not an outside air temperature is less than a predetermined threshold value; and a third step of inhibiting the water discharge from the water discharge valve from a time when the starting of the system is requested to a time when the temperature of the system reaches a predetermined temperature, in a case where it is judged in the first step that the starting of the system has been requested and it is judged in the second step that the outside air temperature is less than the predetermined threshold value.

In a case where such constitution and method are employed, the water content in the discharge channel can be inhibited from flowing into the water discharge valve from the time when the starting of the system is requested in the environment (e.g., a low-temperature environment below the freezing point) where the outside air temperature is less than the predetermined threshold value to the time when the temperature of the system reaches the predetermined temperature. Therefore, even in the low-temperature environment, the freezing of the water discharge valve (and the closing of the water discharge valve due to the freezing) can be inhibited. Here, the "request for the starting of the system" means information (e.g., the ON-signal of an ignition switch) for starting the fuel cell system having an operation stop state. Moreover, the "temperature of the system" means the average temperature of the whole fuel cell system or the temperature (e.g., the temperature in the water discharge channel) of a specific constitution in the fuel cell system.

In the fuel cell system, the water discharge control means can be employed which controls the water discharge valve so as to allow the water discharge from the water discharge valve, in a case where the quantity of the heat of water received in the water discharge valve exceeds a predetermined quantity of heat. Moreover, as the "predetermined quantity of heat", a quantity of heat to burst through zero degree (the quantity of the heat required for the water discharge valve and the water discharge channel to exceed zero degree Centigrade in the environment in which the outside air temperature is zero degree Centigrade or less) may be employed.

In a case where such a constitution is employed, even when the water is received in the water discharge valve, the quantity of the heat of the received water exceeds the predetermined quantity of the heat, and then the water discharge from the water discharge valve can be allowed. Therefore, it is possible to solve a problem that the water is frozen in the water discharge valve or the water discharge channel and that the water discharge is stopped (e.g., in a case where a gas/water discharge valve to simultaneously perform gas discharge and water discharge is employed, any substance that does not contribute to power generation, for example, nitrogen is not discharged from the water discharge channel or the like).

Moreover, in the fuel cell system, the gas/water discharge valve which performs both the water discharge and the gas discharge can be employed as the water discharge valve. In such a case, the system can be provided with fuel supply control means for setting the amount of a fuel gas to be supplied to and/or circulated through the fuel cell to an amount larger than a predetermined amount, while the water discharge from the gas/water discharge valve is inhibited by the water discharge control means.

In a case where such a constitution is employed, while the gas or water discharge from the gas/water discharge valve is inhibited, the amount of the fuel gas to be supplied to and/or circulated through the fuel cell can be set to the amount larger than the predetermined amount (e.g., the amount of the fuel gas to be supplied and/or circulated during usual starting, when the gas or water discharge is not inhibited). Therefore, it can be prevented that the concentration of a fuel to be supplied to the fuel cell lowers due to the inhibition of the gas discharge and the water discharge.

Moreover, the fuel cell system may further comprise a supply channel which supplies the fuel gas supplied from a fuel supply source to the fuel cell, and a variable gas supply device which adjusts a gas state on the upstream side of the supply channel to supply the gas to a downstream side. In such a case, there can be employed the fuel supply control means for controlling the variable gas supply device so as to set the amount of the fuel gas to be supplied to the fuel cell to the amount larger than the predetermined supply amount, while the water discharge from the water discharge valve is inhibited by the water discharge control means.

In a case where such a constitution is employed, while the gas or water discharge from the gas/water discharge valve is inhibited, the variable gas supply device can be controlled to set the amount of the fuel gas to be supplied to the fuel cell to the amount larger than the predetermined supply amount (e.g., the supply amount during the usual starting, when the gas or water discharge is not inhibited). It is to be noted that the "gas state" is a gas state represented by a flow rate, a pressure, a temperature, a molecular concentration or the like, and especially includes at least one of the gas flow rate and the gas pressure. As the variable gas supply device, for example, an injector may be employed.

Moreover, the fuel cell system may further comprise a supply channel which supplies, to the fuel cell, the fuel gas supplied from a fuel supply source, a circulation channel which corresponds to the water discharge channel and which circulates, through the supply channel, a fuel off gas discharged from the fuel cell, and a circulation pump which forcibly circulates, through the supply channel, the gas in the circulation channel. In such a case, there may be employed fuel supply control means for setting the amount of the fuel gas to be circulated through the fuel cell to an amount larger than a predetermined circulation amount, while the water discharge from the gas/water discharge valve is inhibited by the water discharge control means.

According to such a constitution, while the gas or water discharge from the gas/water discharge valve is inhibited, the circulation pump can be controlled to set the amount of the fuel gas to be circulated through the fuel cell to the amount larger than the predetermined circulation amount (e.g., the circulation amount during the usual starting, when the gas or the water discharge is not inhibited).

According to the present invention, in the fuel cell system provided with the water discharge valve, it is possible to inhibit the freezing of the water discharge valve or the water discharge channel in a low-temperature environment below the freezing point or the like.

BEST MODE FOR CARRYING OUT THE INVENTION

A fuel cell system 1 in an embodiment according to the present invention will hereinafter be described with reference to the drawings. In the present embodiment, an example in which the present invention is applied to a car-mounted power generation system of a fuel cell vehicle will be described.

Figure 1:
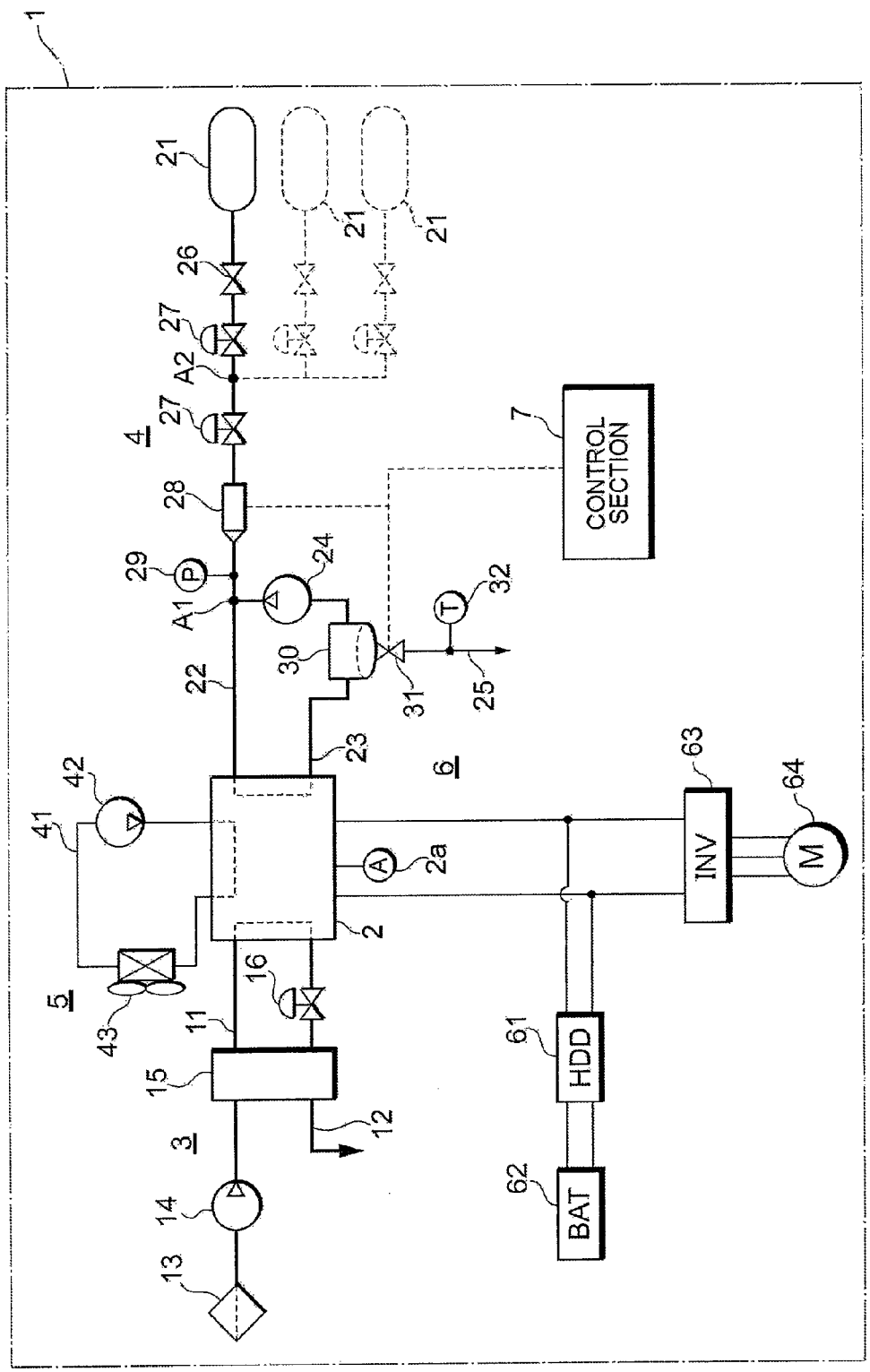
FIG. 1 is a constitution diagram of a fuel cell system according to an embodiment of the present invention.

First, the constitution of the fuel cell system 1 according to the embodiment of the present invention will be described with reference to FIG. 1. As shown in FIG. 1, the fuel cell system 1 according to the present embodiment includes a fuel cell 2 which receives the supply of a reactive gas (an oxidizing gas and a fuel gas) to generate a power; an oxidizing gas piping system 3 which supplies air as the oxidizing gas to the fuel cell 2; a fuel gas piping system 4 which supplies a hydrogen gas as the fuel gas to the fuel cell 2; a refrigerant piping system 5 which supplies a refrigerant to the fuel cell 2 to cool the fuel cell 2; a power system 6 which supplies or discharges the power of the system; and a control section 7 which generally controls the whole system.

The fuel cell 2 has a stack structure which is constituted of, for example, a solid polymer electrolytic type and in which a large number of unitary cells are laminated. The unitary cell of the fuel cell 2 has an air electrode on one surface of an electrolyte constituted of an ion exchange film and a fuel electrode on the other surface, and further has a pair of separators so as to hold the air electrode and the fuel electrode from opposite sides. The fuel gas is supplied to the fuel gas channel of one separator, and the oxidizing gas is supplied to the oxidizing gas channel of the other separator. These gases are supplied, whereby the fuel cell 2 generates the power. A current sensor 2a which detects a current during the power generation is attached to the fuel cell 2.

The oxidizing gas piping system 3 includes an air supply channel 11 through which the oxidizing gas to be supplied to the fuel cell 2 flows, and a gas discharge channel 12 through which an oxidizing off gas discharged from the fuel cell 2 flows. The air supply channel 11 is provided with a compressor 14 which takes the oxidizing gas via a filter 13, and a humidifier 15 which humidifies the oxidizing gas fed under pressure by the compressor 14. The oxidizing off gas which flows through the gas discharge channel 12 passes through a back pressure adjustment valve 16, is used in water content exchange in the humidifier 15, and is finally discharged as an exhaust gas to the atmosphere outside the system. The compressor 14 is driven by a motor (not shown) to take the oxidizing gas from the atmosphere.

The fuel gas piping system 4 has a hydrogen supply source 21; a hydrogen supply channel 22 through which the hydrogen gas to be supplied from the hydrogen supply source 21 to the fuel cell 2 flows; a circulation channel 23 for returning, to a joining part A1 of the hydrogen supply channel 22, a hydrogen off gas discharged from the fuel cell 2; a hydrogen pump 24 which feeds, to the hydrogen supply channel 22, the hydrogen off gas under pressure in the circulation channel 23; and a gas/water discharge channel 25 branched and connected to the circulation channel 23.

The hydrogen supply source 21 corresponds to a fuel supply source according to the present invention, is constituted of, for example, a high-pressure tank, a hydrogen occluded alloy or the like, and can be constituted so as to receive the hydrogen gas of, for example, 35 MPa or 70 MPa. When a shut valve 26 described later is opened, the hydrogen gas flows from the hydrogen supply source 21 to the hydrogen supply channel 22. The pressure of the hydrogen gas is finally reduced to, for example, about 200 kPa by a regulator 27 and an injector 28 as described later, and the gas is supplied to the fuel cell 2. It is to be noted that the hydrogen supply source 21 may be constituted of a reformer which forms a hydrogen-rich reformed gas from a hydrocarbon-based fuel, and a high-pressure gas tank which brings the reformed gas formed by this reformer into a high-pressure state to accumulate the pressure. Alternatively, a tank having the hydrogen occluded alloy may be employed as the fuel supply source 21.

The hydrogen supply channel 22 is provided with the shut valve 26 which shuts or allows the supply of the hydrogen gas from the hydrogen supply source 21, the regulator 27 which adjusts the pressure of the hydrogen gas, and the injector 28. On the downstream side of the injector 28 and on the upstream side of the joining part A1 of the hydrogen supply channel 22 and the circulation channel 23, a pressure sensor 29 which detects the pressure of the hydrogen gas in the hydrogen supply channel 22 is provided. Furthermore, on the upstream side of the injector 28, there are provided a pressure sensor and a temperature sensor (not shown) which detect the pressure and the temperature of the hydrogen gas in the hydrogen supply channel 22.

The regulator 27 is a device which adjusts the upstream pressure (the primary pressure) of the regulator into a preset secondary pressure. In the present embodiment, a mechanical pressure reduction valve which reduces the primary pressure is employed as the regulator 27. As the constitution of the mechanical pressure reduction valve, a known constitution may be employed which has a housing provided with a back pressure chamber and a pressure adjustment chamber formed via a diaphragm and in which the primary pressure is reduced into a predetermined pressure owing to the back pressure of the back pressure chamber to form the secondary pressure in the pressure adjustment chamber. In the present embodiment, as shown in FIG. 1, two regulators 27 are arranged on the upstream side of the injector 28, whereby the upstream pressure of the injector 28 can effectively be reduced. Therefore, the degree of freedom in design of the mechanical structure (a valve body, a housing, a channel, a driving device and the like) of the injector 28 can be raised. Moreover, the upstream pressure of the injector 28 can be reduced, so that it can be prevented that the valve body of the injector 28 does not easily move owing to the increase of a pressure difference between the upstream pressure of the injector 28 and the downstream pressure thereof. Therefore, the variable pressure adjustment width of the downstream pressure of the injector 28 can be broadened, and the lowering of the response property of the injector 28 can be inhibited. The regulator 27 adjusts the gas state (the gas pressure) on the upstream side of the hydrogen supply channel 22 to supply the gas to a downstream side, and corresponds to a variable gas supply device according to the present invention.

The injector 28 is an electromagnetic driving type opening/closing valve in which the valve body is directly driven with an electromagnetic driving force and disposed away from a valve seat in a predetermined drive cycle, whereby a gas flow rate or a gas pressure can be adjusted. The injector 28 includes the valve seat having an injection hole which injects a gas fuel such as the hydrogen gas, and also includes a nozzle body which supplies and guides the gas fuel to the injection hole, and the valve body movably received and held in an axial direction (a gas flow direction) with respect to this nozzle body to open and close the injection hole. In the present embodiment, the valve body of the injector 28 is driven by a solenoid which is an electromagnetic driving device, and a pulse-like excitation current supplied to this solenoid can be turned on or off to switch the opening area of the injection hole in two stages or multiple stages. The gas injection time and the gas injection timing of the injector 28 are controlled based on a control signal output from the control section 7, whereby the flow rate and the pressure of the hydrogen gas are precisely controlled. In the injector 28, the valve (the valve body and the valve seat) is directly driven with the electromagnetic driving force to open or close, and the drive cycle of the valve can be controlled into a highly responsive region, so that the injector has a high response property.

In the injector 28, to supply the gas with a demanded flow rate to the downstream side of the injector, at least one of the opening area (the open rate) and the opening time of the valve body provided in the gas channel of the injector 28 is changed, whereby the flow rate (or the hydrogen molecular concentration) of the gas to be supplied to the downstream side (a fuel cell 2 side) is adjusted. It is to be noted that the valve body of the injector 28 is opened or closed to adjust the gas flow rate, and the pressure of the gas to be supplied to the downstream side of the injector 28 is reduced as compared with the gas pressure on the upstream side of the injector 28, so that the injector 28 can be interpreted as a pressure adjustment valve (a pressure reduction valve, a regulator). Moreover, in the present embodiment, the injector can be interpreted as a variable pressure adjustment valve capable of changing the adjustment amount (the reduction amount) of the upstream gas pressure of the injector 28 so that the pressure meets a demanded pressure in a predetermined pressure range based on a gas demand. The injector 28 adjusts a gas state (a gas flow rate, a hydrogen molecular concentration or a gas pressure) on the upstream side of the hydrogen supply channel 22 to supply the gas to the downstream side, and corresponds to the variable gas supply device according to the present invention.

It is to be noted that in the present embodiment, as shown in FIG. 1, the injector 28 is arranged on the upstream side of the joining part A1 of the hydrogen supply channel 22 and the circulation channel 23. Moreover, as shown by broken lines in FIG. 1, in a case where a plurality of hydrogen supply sources 21 are employed as fuel supply sources, the injector 28 is arranged on the downstream side of a part (a hydrogen gas joining part A2) in which the hydrogen gases supplied from the hydrogen supply sources 21 are joined.

The circulation channel 23 is connected to the gas/water discharge channel 25 via a gas-liquid separator 30 and a gas/water discharge valve 31. The gas-liquid separator 30 collects a water content from the hydrogen off gas. The gas/water discharge valve 31 operates in accordance with a command from the control section 7 to discharge (purge), from the system, the water content collected by the gas-liquid separator 30 and the hydrogen off gas (the fuel off gas) including impurities in the circulation channel 23. The gas/water discharge valve 31 is opened, whereby the concentration of the impurities in the hydrogen off gas in the circulation channel 23 lowers, and a hydrogen concentration in the hydrogen off gas to be circulated and supplied rises. The gas-liquid separator 30 is provided with a water temperature sensor (not shown) which detects the temperature of the water content received therein, and the gas/water discharge channel 25 is provided with a temperature sensor 32 which detects the temperature in the channel. Temperature information detected by the water temperature sensor and the temperature sensor 32 is used in purge control during starting described later. The circulation channel 23 and the gas/water discharge channel 25 correspond to one embodiment of a water discharge channel according to the present invention.

The hydrogen off gas discharged via the gas/water discharge valve 31 and the gas/water discharge channel 25 is diluted by a diluter (not shown) to join the oxidizing off gas in the gas discharge channel 12. The hydrogen pump 24 is driven by a motor (not shown) to circulate and supply, to the fuel cell 2, the hydrogen gas in a circulation system, and functions as one embodiment of a circulation pump in the present invention. The circulation system of the hydrogen gas is constituted of the channel on the downstream side of the joining part A1 of the hydrogen supply channel 22, a fuel gas channel formed in the separators of the fuel cell 2, and the circulation channel 23.

The refrigerant piping system 5 has a refrigerant channel 41 which communicates with a cooling channel in the fuel cell 2, a cooling pump 42 provided in the refrigerant channel 41, and a radiator 43 which cools the refrigerant discharged from the fuel cell 2. The cooling pump 42 is driven by a motor (not shown) to circulate and supply, to the fuel cell 2, the refrigerant in the refrigerant channel 41.

The power system 6 includes a high-voltage DC/DC converter 61, a battery 62, a traction inverter 63, a traction motor 64, any type of auxiliary inverter (not shown) and the like. The high-voltage DC/DC converter 61 is a direct-current voltage converter, and has a function of adjusting a direct-current voltage input from the battery 62 to output the voltage to a traction inverter 63 side and a function of adjusting the direct-current voltage input from the fuel cell 2 or the traction motor 64 to output the voltage to the battery 62. The charging/discharging of the battery 62 is realized by these functions of the high-voltage DC/DC converter 61. Moreover, the output voltage of the fuel cell 2 is controlled by the high-voltage DC/DC converter 61.

The battery 62 is constituted by laminating battery cells, has a predetermined high voltage as a terminal voltage, and can be controlled by a battery computer (not shown) to charge a surplus power or auxiliarily supply a power. The traction inverter 63 converts a direct current into a three-phase alternate current to supply the current to the traction motor 64. The traction motor 64 is, for example, a three-phase alternate-current motor, and constitutes the main power source of a vehicle on which the fuel cell system 1 is mounted. The auxiliary inverter is a motor control section which controls the driving of each motor, and converts the direct current into the three-phase alternate current to supply the current to each motor. The auxiliary inverter is, for example, the PWM inverter of a pulse width modulation system, and converts the direct-current voltage output from the fuel cell 2 or the battery 62 into the three-phase alternate-current voltage in accordance with a control instruction from the control section 7 to control a rotary torque generated in each motor.

The control section 7 detects the operation amount of an acceleration operating member (an accelerator or the like) provided in the vehicle, and receives control information such as a demanded acceleration value (e.g., the demanded power generation amount from a load device such as the traction motor 64) to control the operations of various units in the system. It is to be noted that the load device is a generic power consumption device including, in addition to the traction motor 64, an auxiliary device (e.g., the motors of the compressor 14, the hydrogen pump 24, the cooling pump 42 and the like) required for operating the fuel cell 2, an actuator for use in any type of device (a change gear, a wheel control section, a steering device, a suspension device or the like) associated with the running of the vehicle, the air conditioning device (an air conditioner) of a passenger space, illumination, audio or the like.

The control section 7 is constituted of a computer system (not shown). Such a computer system includes a CPU, a ROM, a RAM, a HDD, an input/output interface, a display and the like, and the CPU reads any type of control program recorded in the ROM to execute desired calculation, whereby various processing and control such as purge control described later are performed.

Figure 2:
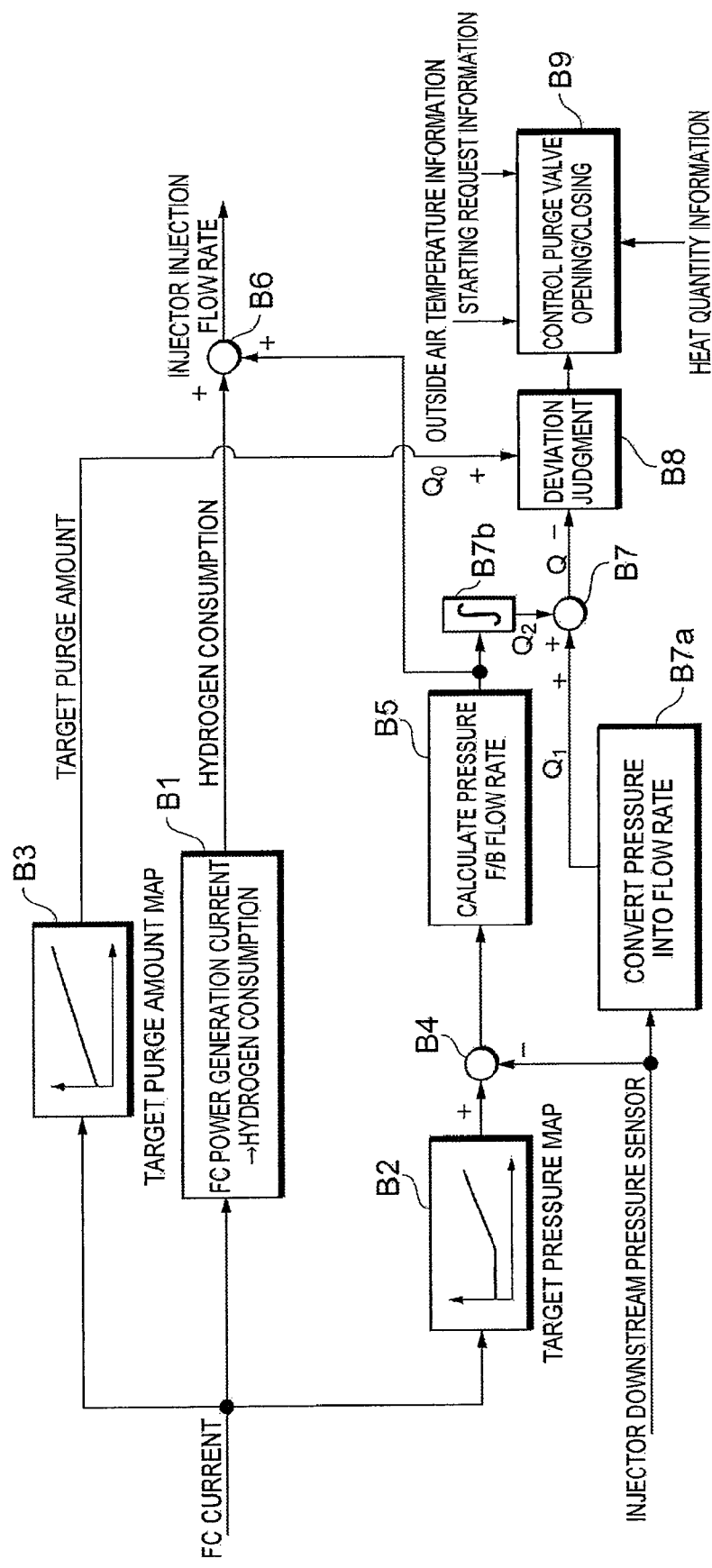
FIG. 2 is a control block diagram showing the control configuration of a control section in the fuel cell system shown in FIG. 1.

Specifically, as shown in FIG. 2, the control section 7 calculates the flow rate (hereinafter referred to as the "hydrogen consumption") of the hydrogen gas consumed by the fuel cell 2 based on the current value during the power generation of the fuel cell 2 detected by the current sensor 2a (a fuel consumption calculating function: B1). In the present embodiment, the hydrogen consumption is calculated and updated for each calculation cycle of the control section 7 by use of a specific calculation formula indicating a relation between the current value during the power generation and the hydrogen consumption.

Moreover, the control section 7 calculates a target pressure value of the hydrogen gas to be supplied to the fuel cell 2 in the downstream position of the injector 28 based on the current value during the power generation of the fuel cell 2 (a target pressure value calculating function: B2), and the section calculates a target purge amount (the target discharge amount of the hydrogen off gas from the gas/water discharge valve 31) (a target purge amount calculating function: B3). In the present embodiment, the target pressure value and the target purge amount are calculated for each calculation cycle of the control section 7 by use of a specific map indicating a relation between the current value during the power generation and the target pressure value and target purge amount.

Furthermore, the control section 7 calculates a deviation between the calculated target pressure value and the pressure value (the detected pressure value) of the downstream position of the injector 28 detected by the pressure sensor 29 (a pressure deviation calculating function: B4). Then, the control section 7 calculates a hydrogen gas flow rate (a feedback correction flow rate) to be added to the hydrogen consumption to reduce the calculated deviation (a correction flow rate calculating function: B5). In the present embodiment, the feedback correction flow rate is calculated using the target follow-up type control of PI control or the like. The control section 7 also adds up the hydrogen consumption and the feedback correction flow rate to calculate the injection flow rate of the injector 28 (an injection flow rate calculating function: B6). Then, the control section 7 calculates the injection time of the injector 28 based on the calculated injection flow rate and a drive cycle, and outputs a control signal for realizing this injection time, whereby the gas injection time and the gas injection timing of the injector 28 are controlled to adjust the flow rate and pressure of the hydrogen gas to be supplied to the fuel cell 2.

In addition, the control section 7 performs the feedback control of the injector 28 (controls the gas injection time and the gas injection timing of the injector 28 so that the detected pressure value in the downstream position of the injector 28 follows a predetermined target pressure value), and the section also performs the opening/closing control of the gas/water discharge valve 31, whereby the water content and the hydrogen off gas in the circulation channel 23 are discharged from the system via the gas/water discharge valve 31. In this case, the control section 7 calculates the total discharge amount (the purge amount) of the hydrogen off gas from the gas/water discharge valve 31 based on the change of a gas supply state from the injector 28 (a purge amount calculating function: B7) to judge whether or not the calculated purge amount is a predetermined target purge amount or more (a purge amount deviation judgment function: B8). Then, the control section 7 opens the gas/water discharge valve 31 in a case where a calculated purge amount Q is a target purge amount $Q_0$ or more (a purge control function: B9).

Here, the purge amount calculating function B7 of the control section 7 will be described in detail. In a case where the gas/water discharge valve 31 is opened to discharge the hydrogen off gas from the circulation channel 23 in a state in which the detected pressure value of the pressure sensor 29 in the downstream position of the injector 28 follows the target pressure value owing to the feedback control of the injector 28, the detected pressure value temporarily lowers. The control section 7 calculates such a pressure decrease due to the discharging (purging) of the hydrogen off gas, and calculates the discharge amount (the flow rate corresponding to the pressure change) of the hydrogen off gas corresponding to the pressure decrease based on this calculated pressure decrease (a pressure change corresponding flow rate calculating function: B7a). In the present embodiment, a pressure change corresponding flow rate $Q_1$ is calculated using a specific calculation formula indicating a relation between the pressure decrease due to the purging and the hydrogen gas discharge amount corresponding to this pressure decrease. Moreover, the control section 7 calculates the feedback correction flow rate (a gas correction supply flow rate) for compensating for the pressure decrease due to the discharging (purging) of the hydrogen off gas (the correction flow rate calculating function: B5), to calculate the integrated value $Q_2$ of this feedback correction flow rate with an elapse of time from a time when the purging is started (a correction flow rate integrating function: B7b). Then, the control section 7 adds up the pressure change corresponding flow rate $Q_1$ and the integrated value $Q_2$ of the feedback correction flow rate with the elapse of time from the time when the purging starts, to calculate the total discharge amount (the purge amount Q) of the hydrogen off gas from the gas/water discharge valve 31 (the purge amount calculating function: B7).

Moreover, the purge control function B9 of the control section 7 will be described in detail. The control section 7 detects the ON-signal (a request for the starting of the system) of the ignition switch of the fuel cell vehicle, and detects an outside air temperature by use of an outside air temperature sensor (not shown). Then, the control section 7 controls the gas/water discharge valve 31 so as to inhibit the water discharge from the gas/water discharge valve 31 from a time when this ON-signal is detected to a time when the temperature of the system reaches a predetermined temperature in a case where the ON-signal of the ignition switch is detected in an environment in which the outside air temperature is less than a predetermined threshold value (e.g., zero degree Centigrade). That is, the control section 7 functions as discharge control means in the present invention. Here, the "temperature of the system" means the average temperature of the whole system or the temperature of a specific constitution in the system. In the present embodiment, the water discharge from the gas/water discharge valve 31 is inhibited until the temperature (the temperature in the gas/water discharge channel 25) detected via the temperature sensor 32 reaches the predetermined temperature. The "predetermined temperature" as a standard in a case where the water discharge is allowed can appropriately be set in accordance with the scale or the specification of the whole system, the outside air temperature or the like.

Furthermore, the control section 7 controls the gas/water discharge valve 31 so as to allow the water discharge from the gas/water discharge valve 31 (even when the temperature in the gas/water discharge channel 25 is less than the predetermined temperature) in a case where the quantity of heat of the water received in the gas-liquid separator 30 (the water received in the gas/water discharge valve 31) exceeds a predetermined quantity of the heat. In the present embodiment, the quantity of the heat of the received water is calculated based on the temperature of the received water detected via a water temperature sensor and the amount of the received water estimated from the current value during the power generation of the fuel cell 2. The "predetermined quantity of heat" as the standard in a case where the water discharge is allowed can appropriately be set in accordance with the scale or specification of the whole system, the sectional area or channel length of the gas/water discharge channel 25 or the like. In the present embodiment, a quantity of heat to burst through zero degree Centigrade (the quantity of heat required for the gas/water discharge valve 31 and the gas/water discharge channel 25 to exceed zero degree Centigrade in the environment in which the outside air temperature is zero degree Centigrade) calculated based on the temperature in the gas/water discharge channel 25 detected via the temperature sensor 32 and the heat capacity of the gas/water discharge channel 25 is employed as the "predetermined quantity of heat".

Moreover, while the water discharge from the gas/water discharge valve 31 is inhibited, the control section 7 controls the injector 28 so as to set the amount of the hydrogen gas to be supplied to the fuel cell 2 to an amount larger than a predetermined supply amount, and the section controls the hydrogen pump 24 so as to set the amount of the hydrogen gas to be circulated through the fuel cell 2 to an amount larger than a predetermined circulation amount. That is, the control section 7 also functions as fuel supply control means in the present invention. In the present embodiment, as the "predetermined supply (circulation) amount", there is employed the supply (circulation) amount during usual starting, when the gas or water discharge is not inhibited.

Figure 3:
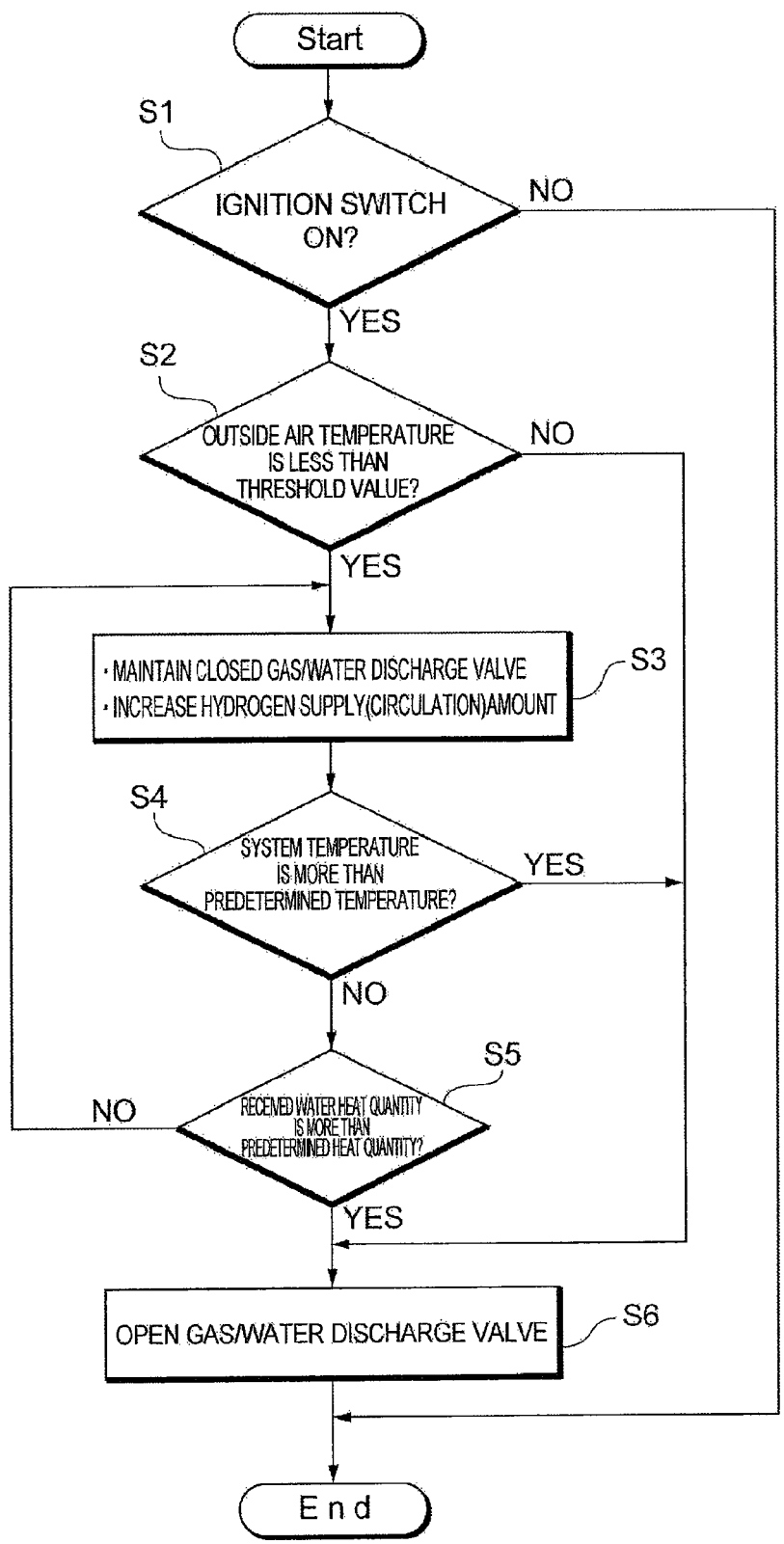
FIG. 3 is a flow chart showing a purge control method (a water discharge control method according to the embodiment of the present invention) during the starting of the fuel cell system shown in FIG. 1.

Next, a purge control method (a water discharge control method) during the starting of the fuel cell system 1 according to the present embodiment will be described with reference to the flow chart of FIG. 3.

During the usual operation of the fuel cell system 1, the hydrogen gas is supplied from the hydrogen tank 21 to the fuel electrode of the fuel cell 2 via the hydrogen supply channel 22, and the humidified and adjusted air is supplied to the oxidizing electrode of the fuel cell 2 via the air supply channel 11 to generate a power. In this case, the power (the demanded power) to be derived from the fuel cell 2 is calculated by the control 4 section 7, and the amounts of the hydrogen gas and air are supplied into the fuel cell 2 in accordance with the amount of the power generated by the fuel cell. In the present embodiment, the purge control is performed during the starting of the system before such a usual operation is performed. It is to be noted that the gas/water discharge valve 31 is closed before starting the fuel cell system 1.

First, the control section 7 of the fuel cell system 1 judges whether or not the ON-signal of the ignition switch (the request for the starting of the system) is present in an operation stop state (a starting request judgment step: S1). Subsequently, in a case where the ON-signal of the ignition switch is detected, the control section 7 detects the outside air temperature by use of an outside air temperature sensor, to judge whether or not the outside air temperature is less than a predetermined threshold value (e.g., zero degree Centigrade) (an outside air temperature judgment step: S2).

Subsequently, the control section 7 shifts to a step of opening the gas/water discharge valve 31 (a purge valve opening step S6 described later) in a case where it is judged in the outside air temperature judgment step S2 that the outside air temperature is a predetermined threshold value or more. On the other hand, in a case where it is judged in the outside air temperature judgment step S2 that the outside air temperature is less than the predetermined threshold value, the control section 7 maintains the closed state of the gas/water discharge valve 31, and controls the injector 28 and the hydrogen pump 24 so that the amount of the hydrogen gas to be supplied to and circulated through the fuel cell 2 is set to an amount larger than a predetermined amount (a closed purge valve maintaining step: S3).

Subsequently to the closed purge valve maintaining step S3, the control section 7 judges whether or not the temperature in the gas/water discharge channel 25 detected via the temperature sensor 32 reaches a predetermined temperature (a system temperature judgment step: S4). In a case where an affirmative judgment is obtained, the step shifts to a step of opening the gas/water discharge valve 31 (the purge valve opening step S6 described later). On the other hand, in a case where a negative judgment is obtained in the system temperature judgment step S4, the control section 7 judges whether or not the quantity of the heat of the water received in the gas/water discharge valve 31 (the water received in the gas-liquid separator 30) exceeds a predetermined quantity of heat (the received water heat quantity judgment step: S5).

Subsequently, when the negative judgment is obtained in the received water heat quantity judgment step S5, the control section 7 repeatedly performs the step of shifting to the closed purge valve maintaining step S3. On the other hand, when the affirmative judgment is obtained, the control section opens the gas/water discharge valve 31 (the purge valve opening step: S6). Through the above step group, the purging of the fuel cell system 1 during the starting is realized.

It is to be noted that the starting request judgment step S1 and the outside air temperature judgment step S2 in the present embodiment correspond to the first step and the second step in the present invention, respectively, and the closed purge valve maintaining step S3 and the system temperature judgment step S4 in the present embodiment correspond to the third step in the present invention.

In the fuel cell system 1 of the above embodiment, from a time when the ON-operation of the ignition switch (the request for the starting of the system) is performed in a low-temperature environment where the outside air temperature is less than the predetermined threshold value to a time when the temperature of the system reaches the predetermined temperature, the water content in the circulation channel 23 can be inhibited from flowing into the gas/water discharge valve 31. Therefore, even in the low-temperature environment, the freezing of the gas/water discharge valve 31 (and the closing of the gas/water discharge valve 31 due to the freezing) can be inhibited.

Moreover, in the fuel cell system 1 of the above embodiment, when the quantity of the heat of the water received in the gas-liquid separator 30 exceeds the predetermined quantity of the heat, the water discharge from the gas/water discharge valve 31 can be allowed. Therefore, it is possible to solve a problem that the water is frozen in the gas/water discharge valve 31 to stop the water discharge, and that any substance that does not contribute to the power generation, for example, nitrogen is not similarly discharged and is accumulated.

Furthermore, in the fuel cell system 1 of the above embodiment, while the gas/water discharge from the gas/water discharge valve 31 is inhibited, the amounts of the hydrogen gas to be supplied to and circulated through the fuel cell 2 can be set to the amount larger than the predetermined amount (the supply amount and the circulation amount during the usual starting, when the gas/water discharge is not inhibited). Therefore, it can be prevented that the concentration of hydrogen to be supplied to the fuel cell 2 lowers owing to the inhibiting of the gas discharge simultaneously with the water discharge.

Figure 4:
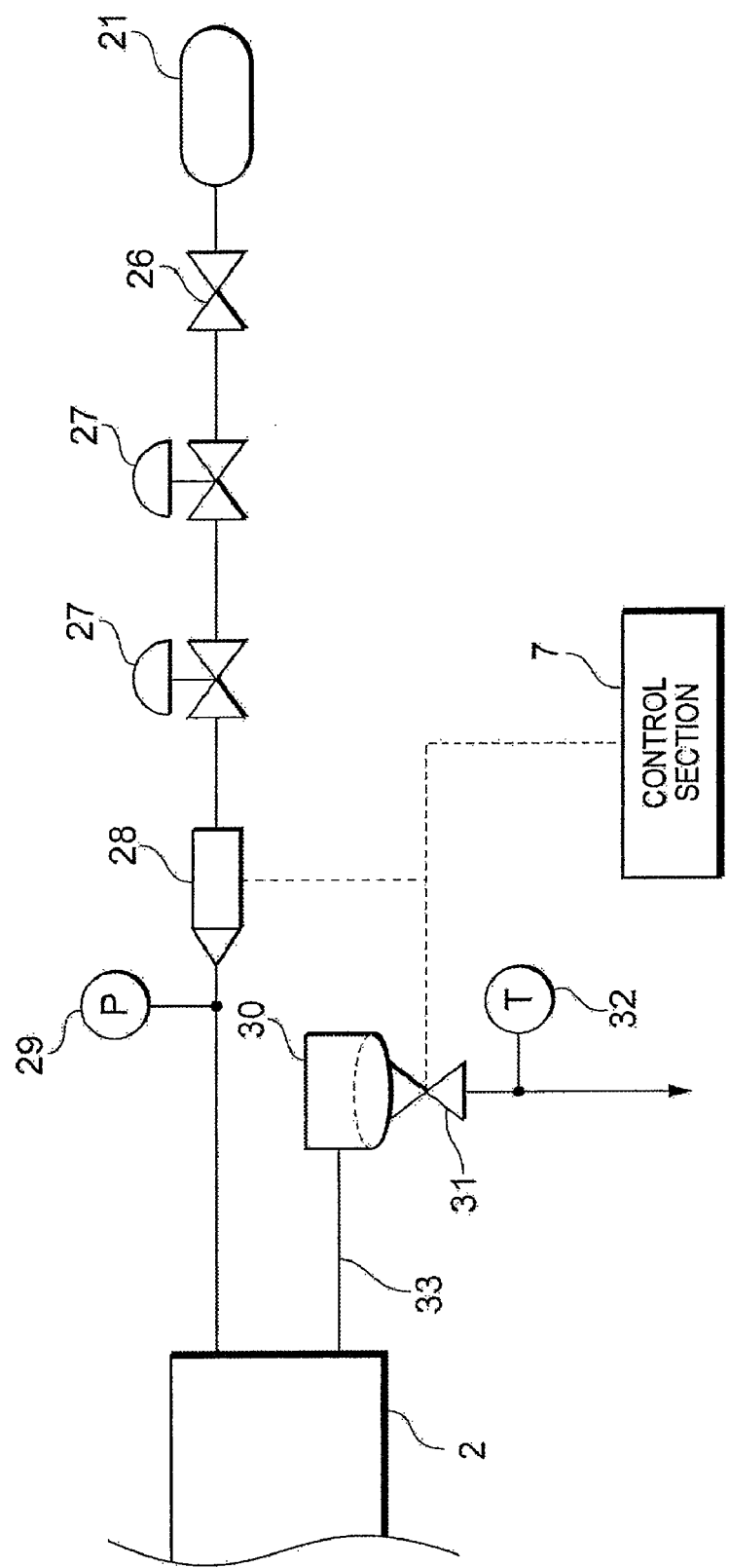
FIG. 4 is a constitution diagram showing a modification in the fuel cell system shown in FIG. 1.

It is to be noted that in the above embodiment, the example in which the hydrogen gas piping system 4 of the fuel cell system 1 is provided with the circulation channel 23 has been described, but as shown in, for example, FIG. 4, a discharge channel 33 is connected to a fuel cell 2, and the circulation channel 23 may be omitted. Even when such a constitution (a dead end system) is employed, the ON-operation of the ignition switch is performed in the low-temperature environment, and the control section 7 maintains the closed state of the gas/water discharge valve 31, whereby function and effect similar to those of the above embodiment can be obtained. The discharge channel 33 in such a constitution corresponds to one embodiment of a water discharge channel in the present invention.

Moreover, in the above embodiment, the example in which the circulation channel 23 is provided with the hydrogen pump 24 has been described, but an ejector may be employed instead of the hydrogen pump 24. Furthermore, in the above embodiment, the example in which the gas/water discharge valve 31 to realize both the gas discharge and the water discharge is provided in the circulation channel 23 has been described. However, a water discharge valve which discharges, from the system, the water content collected by the gas-liquid separator 30 is provided separately from a gas discharge valve for discharging, from the system, the gas in the circulation channel 23, and the control section 7 may separately control the water discharge valve and the gas discharge valve. Even in a case where such a constitution is employed, when the ON-operation of the ignition switch is performed in the low-temperature environment, the control section 7 maintains the closed state of the water discharge valve, whereby function and effect similar to those of the above embodiment can be obtained.

Furthermore, in the above embodiment, the example has been described in which while the water discharge from the gas/water discharge valve 31 is inhibited, the injector 28 is controlled to increase the amount of the hydrogen gas to be supplied to the fuel cell 2. However, the regulator 27 can be controlled instead of the injector 28 (or simultaneously with the injector 28) to increase the amount of the hydrogen gas to be supplied to the fuel cell 2.

Moreover, in the above embodiment, the example has been described in which while the water discharge from the gas/ water discharge valve 31 is inhibited, both the injector 28 and the hydrogen pump 24 are controlled to increase both the amounts of the hydrogen gas to be supplied to and circulated through the fuel cell 2. However, only one of the injector 28 and the hydrogen pump 24 may be controlled to increase one of the amounts of the hydrogen gas to be supplied to and circulated through the fuel cell 2.

Industrial Applicability

As described in the embodiment, a fuel cell system according to the present invention can be mounted on a fuel cell vehicle, and the system may be mounted on any type of mobile article (a robot, a ship, an airplane or the like) other than the fuel cell vehicle. Moreover, the fuel cell system according to the present invention may be applied to a stationary power generation system for use as a power generation equipment for a construction (a housing, a building or the like).

The invention claimed is:

1. A fuel cell system comprising:
a fuel cell;
a water discharge channel through which a water content discharged from this fuel cell flows;
a water discharge valve which discharges, from the system, the water content in the water discharge channel; and
a water discharge control device programmed to control the water discharge valve so as to inhibit the water discharge from the water discharge valve from a time when the starting of the system is requested to a time when the temperature of the system reaches a predetermined temperature, in a case where the starting of the system is requested in an environment where an outside air temperature is less than a predetermined threshold value.

2. The fuel cell system according to claim 1, wherein the water discharge control device controls the water discharge valve so as to allow the water to discharge from the water discharge valve in a case where the quantity of the heat of water received in the water discharge valve exceeds a predetermined quantity of heat.

3. The fuel cell system according to claim 2, wherein the predetermined quantity of heat is a quantity of heat required for the water discharge valve and the water discharge channel to exceed 0° C. in an environment where the outside air temperature is 0° C. or less.

4. The fuel cell system according to claim 1, wherein the water discharge valve is a gas/water discharge valve which performs both the water discharge and gas discharge, the fuel cell system further comprising: a fuel supply control means device for setting the amount of the fuel gas to be supplied to and/or circulated through the fuel cell to an amount larger than a predetermined amount, while the water discharge from the gas/water discharge valve is inhibited by the water discharge control means device.

5. The fuel cell system according to claim 4, further comprising: a supply channel which supplies the fuel gas supplied from a fuel supply source to the fuel cell; and a variable gas supply device which adjusts a gas state on the upstream side of the supply channel to supply the gas to a downstream side, wherein the fuel supply control device controls the variable gas supply device so as to set the amount of the fuel gas to be supplied to the fuel cell to the amount larger than the predetermined supply amount, while the water discharge from the water discharge valve is inhibited by the water discharge control device.

6. The fuel cell system according to claim 4, further comprising: a supply channel which supplies, to the fuel cell, the fuel gas supplied from a fuel supply source; a circulation channel which corresponds to the water discharge channel and which circulates, through the supply channel, a fuel off gas discharged from the fuel cell; and a circulation pump which forcibly circulates, through the supply channel, the gas in the circulation channel, wherein the fuel supply control device controls the circulation pump so as to set the amount of the fuel gas to be circulated through the fuel cell to an amount larger than a predetermined circulation amount, while the water discharge from the gas/water discharge valve is inhibited by the water discharge control device.

7. A water discharge control method of a fuel cell system including a fuel cell, a water discharge channel through which a water content discharged from this fuel cell flows and a water discharge valve which discharges, from the system, the water content in this water discharge channel, the water discharge control method comprising:
a first step of judging whether or not the starting of the system has been requested;
a second step of judging whether or not an outside air temperature is less than a predetermined threshold value; and
a third step of inhibiting the water discharge from the water discharge valve from a time when the starting is requested to a time when the temperature of the system reaches a predetermined temperature, in a case where it is judged in the first step that the starting of the system is requested and it is judged in the second step that the outside air temperature is less than the predetermined threshold value.

* * * * *